May 29, 1962 A. BRUEDER 3,036,426
REGULATOR MEANS FOR DRIVING AUTOMOTIVE VEHICLES
EQUIPPED WITH INFINITELY VARIABLE-SPEED DRIVE
Filed June 1, 1959 3 Sheets-Sheet 2
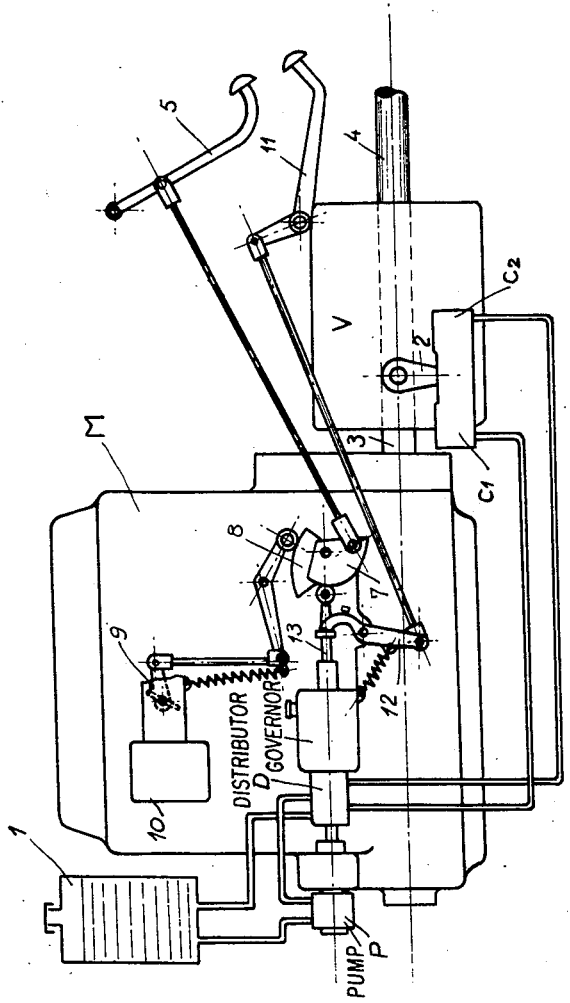
INVENTOR
ANTOINE BRUEDER
By
Wenderoth, Lind & Ponack
Attys.

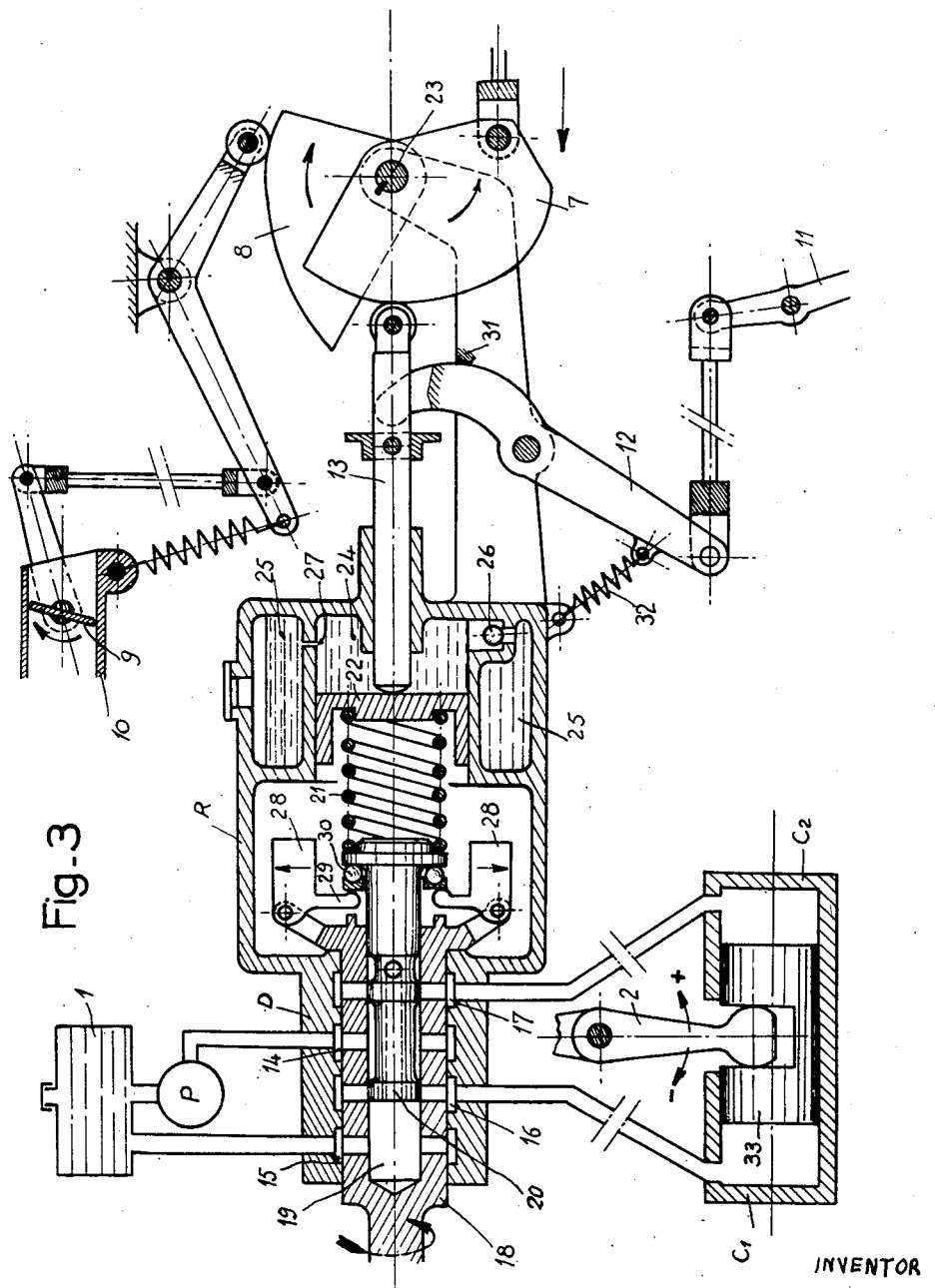

United States Patent Office 3,036,426
Patented May 29, 1962

3,036,426
REGULATOR MEANS FOR DRIVING AUTOMOTIVE VEHICLES EQUIPPED WITH INFINITELY VARIABLE-SPEED DRIVE
Antoine Brueder, Paris, France, assignor to Societe Anonyme Andre Citroen, Paris, France, a corporation of France
Filed June 1, 1959, Ser. No. 817,268
Claims priority, application France Aug. 25, 1958
5 Claims. (Cl. 60—12)

It is the essential object of the present invention to improve the conditions of operation and the driving of automotive vehicles equipped with an infinitely variable-speed drive, also called variable-speed transmission, providing a continuous change in the transmission ratio. This invention is concerned with an improved regulator device designed with a view to yield this result.

The device according to the present invention is applicable to the so-called "hydrostatic" infinitely variable-speed drive wherein a complete range of transmission ratios can be obtained in a continuous manner by simply operating a control lever. Various types of hydrostatic transmissions have already been embodied in the practice and the regulator according to this invention is applicable to all of them. "Mechanical" or "electrical" infinitely variable-speed drives are also known or may be developed, and the engine regulating and adjusting device of this invention is also applicable to these drives.

In vehicles equipped with conventional three-speed or four-speed change-speed transmissions it is not possible to have at any time the exact engine operating conditions corresponding to either the minimum fuel consumption or the maximum power output. To achieve this would require a considerable multiplication of the number of speed ratios and in the specific case of minimum fuel consumption the so-called "overdrive" ratios would be necessary so as to gear up the engine considerably more than what is considered as current practice.

In order to afford a clear understanding of the reasoning on which the present invention is based, reference may be had to FIGURE 1 of the attached drawings, wherein the curve A denotes the power required as a function of the vehicle speed on the level, whereas curve B denotes the engine power available under fully-open throttle conditions, the transmission ratio contemplated corresponding to that usually called "direct drive" which, in the case considered herein by way of example, provides a speed of 25 kilometers per hour (15.5 m.p.h.) per 1,000 r.p.m. The diagram also shows a series of curves representing the conventional pattern of the specific fuel consumption figures in grams per H.P/hour.

From this diagram it is apparent that a road speed of 75 km./h. (46.6 m.p.h.) requires 17.3 H.P. for the fictitious vehicle contemplated herein. With the gear ratio giving 25 km./h. (15.5 m.p.h.) per 1,000 r.p.m. the fuel consumption is 250 grams per H.P./hour.

If the gear ratio were such as to provide a speed of 50 km./h. (31.07 m.p.h.) per 1,000 r.p.m., the engine would revolve only at 1,500 r.p.m. in the region of its maximum power output at this rotational speed and with the minimum specific fuel consumption for this power output (point C of the diagram). Obviously, the result would be very appreciable.

In the same line of thought, at 100 km./h. (62.14 m.p.h.) the power requirement would be 35 H.P. with a fuel consumption of 240 grams at 4,000 r.p.m., whereas if the gear ratio were such as to provide a vehicle speed of 33.3 km./h. (20.7 m.p.h.) per 1,000 r.p.m., the engine would revolve only at a speed of 3,000 r.p.m. and the fuel consumption would also be the minimum consumption obtainable with this power output figure (point D).

The above reasoning is also valid for all the curves corresponding to specific conditions of operation: hill-climbing, downhill driving, or acceleration and deceleration. It is constantly possible to cause the engine to operate in the region of minimum fuel consumption with respect to the power requirement (curve E), provided that an infinitely variable-speed transmission providing a wide range of gear ratios, and means ensuring an automatic regulation, are available.

Now it is the specific object of this invention to provide a device whereby this regulation problem can be solved in a simple and efficient manner.

Firstly, it may be pointed out that the driving of an automotive vehicle consists inter alia in adjusting the engine power output as a function of the desired speed. Up to now, this adjustment was effected either by opening more or less the carburetor throttle (in the case of petrol engines), or by modifying the fuel output (in the case of fuel-injection engines).

With the device of this invention the driver actuates an engine speed regulator by simply compressing a spring, the regulator acting in turn upon the control lever of the infinitely variable-speed drive in order to provide the exact and optimum gear ratio consistent with the speed, load and other driving conditions prevailing at that specific moment.

According to another feature of this invention, the opening of the throttle mounted in the induction pipe of the engine (or the increase in the fuel pump output) is effected mechanically and automatically as a function of the compression effort exerted on the regulator spring, so that at each velocity of rotation the throttle opening giving the "economical" power output of curve E in the diagram of FIG. 1 will be obtained. Of course, this curve is variable with respect to the maximum power output curve, according to the type of engine utilized and the adjustments contemplated.

Contrary to the present practice of automotive vehicles wherein the engines co-act with change-speed transmission or gearboxes of conventional type, the engine is no more operated throughout the "power-area" defined by the curve B, but only along the curve E, save in exceptional cases such as driving downhill at low speed, or extremely slow idling. Now it is evident that these cases are now critical as far as efficiency is concerned.

This novel form of engine operation, characterized by the adjustment of the throttle opening as a function of the requisite rotational speed, affords a higher compression ratio of the engine, the filling of the cylinders with the air-fuel mixture at low rotational speeds being limited by an adequate throttle opening, and besides a high power at low engine speeds is not necessary when an infinitely variable-speed drive is provided.

On the other hand and according to another specific feature of this invention the adjustment of the ignition timing as a function of the engine speed may be accomplished automatically by means of a cam displaceable as a function of the compression of the regulator spring, thus simplifying considerably the design of the ignition timing system.

In a conventional-type vehicle, when the driver releases the accelerator or throttle pedal it is the vehicle that drives the engine by inertia and a braking action is exerted by the engine. This braking action is subordinate to the vehicle speed and to the gear ratio interposed between the engine and the road wheels. Now the higher the reduction ratio, the greater the braking power available. However, it is difficult to change to a lower gear in order to increase the engine braking effect.

With the device proposed herein, the simple fact of releasing the pedal substituted for the accelerator pedal (as will be explained presently) will cause the engine speed to drop to the idling value, thus causing on the one hand the gear ratio providing the minimum reduction ratio (overdrive) to be interposed between the engine and the road wheels and on the other hand the throttle to be closed. Thus, the engine braking action will be reduced to a minimum.

On the other hand, by depressing the brake pedal of the vehicle it is possible to act upon the regulator spring (without interfering with the throttle opening) and therefore to increase the reduction ratio and consequently the engine braking action.

It is quite logical that, as long as no power is required from the engine, the gear reduction provided by the transmission be as small as possible. However, it would be unpleasant to switch immediately to "overdrive" conditions when the accelerator pedal is released. Consequently, according to this invention the return movement of the regulator spring is retarded by adequate means, whereby no change in the reduction ratio can take place under practical conditions during the time necessary for the driver to move his or her foot from the accelerator pedal to the brake pedal.

In order to afford a clearer understanding of the features and advantages characterizing this invention, and of the manner in which it can be carried out, reference will now be made to the accompanying drawings forming part of this invention and illustrating diagrammatically by way of example a typical form of embodiment of the invention. In the drawings:

FIGURE 2 shows diagrammatically the mounting of the device of this invention with its control means on an automotive vehicle; and FIGURE 3 is a more detailed illustration of the arrangement of the regulator.

Figure 1:
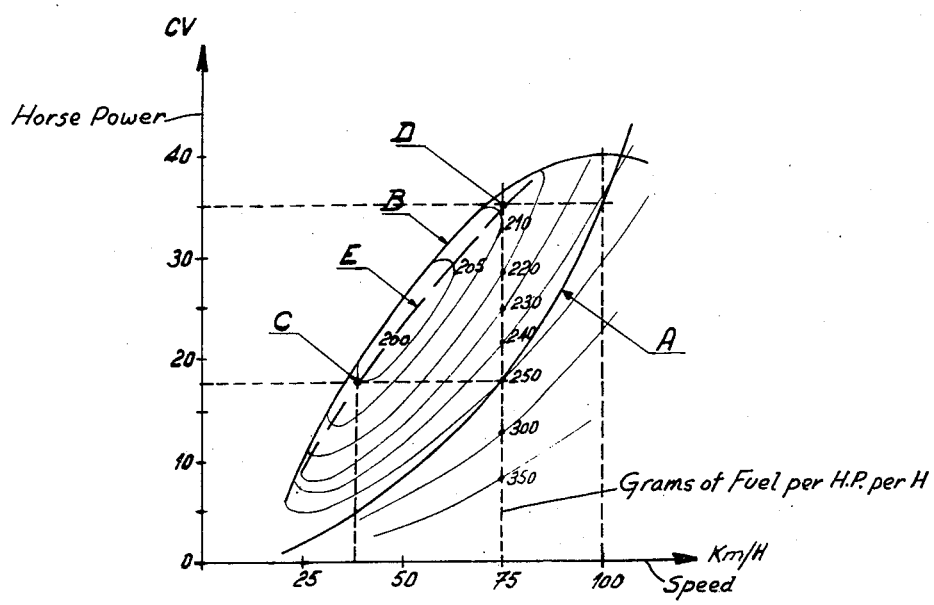
FIGURE 1 is a diagram illustrating the principle upon which the present invention is based.

Referring first to FIG. 2 of the drawings, the reference letter M designates an engine driving the input shaft of the infinitely variable-speed transmission V. Mounted on and driven from the engine is a centrifugal governor R to which a hydraulic distributor D is associated, as shown more in detail in FIG. 3. This distributor is fed by a pump P and causes fluid under pressure to be delivered to one of the cylinders $C^1$ (or $C^2$) controlling the infinitely variable-speed transmission V, while the other cylinder $C^2$ (or $C^1$) is exhausted. The reservoir 1 contains the control fluid. The pistons slidably mounted in cylinders $C^1$ and $C^2$ act upon the control lever 2 which when actuated causes the variation in the transmission ratio between the input shaft 3 and the output shaft or shafts 4 of drive V to take place.

The pedal 5 controls through an adequate linkage a cam member 7 of which each angular position corresponds to a specific adjustment of the regulator R, such that the engine is caused to revolve at a predetermined speed.

Keyed on the same pivot pin or shaft as that carrying the cam member 7 is another cam member 8 adapted, through an adequate linkage, to set the throttle 9 of carburettor 10 in a position corresponding to that required for obtaining the conditions set forth in the preamble.

The ignition timing cam is not shown.

The pedal 11 (which may be a hand lever, or associated with the brake pedal usually provided in automotive vehicles) is operatively connected to a lever 12 adapted, by engaging a push-rod 13, to modify the regulator adjustment (in the direction corresponding to an increase in the engine speed, that is, in the direction providing a higher reduction ratio).

In FIGURE 3, in addition to most of the members and devices set forth hereinabove, there are also shown in detail the component elements of the regulator proper R and of the distributor D.

This distributor consists of a fixed body D formed with an axial bore having a plurality of grooves formed therein, that is to say, a pressure fluid inlet groove 14, an exhaust groove 15, a groove 16 communicating with cylinder $C^1$, and a groove 17 communicating with cylinder $C^2$. In the central bore of the distributor body D is rotatably mounted a shaft 18 formed in turn with an axial bore 19 in which is slidably mounted a valve member 20 formed with the grooves and orifices necessary for the conventional operation of a distributor with a view to supply fluid to one cylinder while the other cylinder is exhausted, or vice-versa.

The detailed description of this distributor is not necessary since it constitutes a conventional element of hydraulic technique and can be embodied in different manners, for example with rotary sleeves or valve members, or with a fixed sleeve and a fixed valve member associated with a separate centrifugal device actuating the valve member.

The right-hand end portion of valve member 20 engages a spring 21 bearing in turn on a piston 22. This piston may be moved by pushing in one or the other direction a rod 13 responsive to the rotation of the cam member 7 about its shaft 23.

During its movements the piston 22 causes a variation in the volume of the space 24 filled with liquid and communicating with the small reservoir 25 through a non-return valve 26, on the one hand, and a gauged orifice 27, on the other hand, so that the displacement of piston 22 takes place freely toward the left and is retarded in the opposite direction.

The shaft 18 of the distributor supports on its inner or right-hand end balance or inertia weights 28 responsive to the centrifugal force developed when this shaft 18 is driven from the engine. These weights 28 carry in the usual fashion levers 29 engaging a thrust bearing 30 centered on the slide valve 20, as shown.

In FIGURE 3 the cam member 8 keyed on the same shaft 23 as cam member 7 is shown in the right-hand portion of the figure. This cam member 8 provides the law governing the opening of the carburettor throttle 9 as a function not only of the compression of spring 21 in the regulator, but also of the contour of cam member 7. The lever 12 in its inoperative position engages the stop 31 due to the traction of spring 32. When one presses upon the pedal at the end of the lever 11, the lever 12 rotates about its pivot counter clockwise and drives the shaft 13 which presses upon the piston 22 thus compressing the spring 21 and thus displacing the valve member 20 to the left. This accelerates the engine speed without opening the throttle 9.

The fluid under pressure delivered by the distributor to $C^1$ or $C^2$ causes the piston 33 to move the lever 2 in one or the other direction.

In the case of the diagram of FIG. 3 (and FIG. 2) when the fluid under pressure is delivered to $C^1$, the lever 2 moves in the direction of the arrow + and the ratio of reduction provided by the variable-speed drive is increased, and in the other case (i.e. when the lever 2 is moved to the left) this ratio is reduced.

The assembly described hereinabove and illustrated in the drawings operates as follows:

Assuming that the driver depresses the pedal 5 to set the cam member 7 in a given position, the other cam member 8 will accomplish the same movement and open the throttle 9 to a certain extent. The cam member 7 displaces the push-rod 13 and causes the spring 21 to be somewhat compressed. This spring 21 acts through the medium of slide valve 20 and thrust bearing 30 on the levers 29 of the inertia weights 28 and these weights, due to the centrifugal force developing therein, tend to compress the spring 21, and it is evident that at a certain speed these two opposite forces balance each other.

When this condition of equilibrium is attained, the slide valve 20 is in the neutral position shown in FIG. 3, and thus both cylinders $C^1$, $C^2$ are isolated from the supply as well as from the exhaust of fluid. Thus, the lever 2 occupies a fixed position giving a certain reduction ratio. A condition of equilibrium between the engine power delivered by the equilibrium speed mentioned hereinabove and for the throttle opening given at the moment T for running the vehicle.

If the resistance increases owing for example to an increase in the road inclination the engine will tend to lose speed and the spring 21 becomes preponderant, thereby causing the slide valve 20 to move to the left, the fluid from pump P being thus delivered to $C^1$ while $C^2$ communicates with the exhaust line, and the lever 2 moves to the right, in the direction +, until the equilibrium is obtained in the direction to increase the reduction ratio.

Should the resistance decrease the engine would tend to pick up speed and the slide valve will move to the right, so that the fluid will be fed to $C^2$ to reduce the gear ratio.

If the decrease in the resistance is very pronounced for example when driving downhill, the lever 2 will tend to move in the direction — to give a gradually decreasing reduction ratio, but it will be readily understood that, by construction, some limit will soon be attained.

When the minimum possible reduction ratio is attained, if the resistance continues to decrease the engine speed will increase and the vehicle speed will also increase accordingly. If the driver does not wish to increase this speed, he simply releases the pedal 5, and the throttle 9 will be moved to its closing direction. It is only in this last case that the engine will not operate according to the power curve E of FIG. 1.

When the pedal 5 is released completely the regulator spring will be allowed to expand to push an extent that the centrifugal force developed by the inertia weights 28 will be balanced at the idling speed of the engine (for example 500 r.p.m.) and the throttle 9 will also move to the position corresponding to this idling speed, but, as the engine is driven by the vehicle, its rotational speed will compulsorily be proportional to the vehicle speed and a function of the minimum possible reduction ratio provided by the infinitely variable-speed drive.

Under these conditions, the vehicle is retarded by the engine, but with a moderate force due to the small reduction ratio.

If it is desired to increase the engine braking action, it is therefore sufficient to increase the reduction ratio accordingly. To this end the driver may compress the regulator spring 21 without opening the throttle 9 by depressing the pedal 11. As a result, the slide valve 20 will be moved to the left to supply fluid under pressure to $C^1$ and cause the lever 2 to move in the direction +, this action being the equivalent, in a conventional-type vehicle, to changing down to a low speed for increasing the engine braking action.

Drivers are accustomed, when driving a vehicle on the road, to feel a certain deceleration which is a function of the transmission ratio when they release the throttle control pedal. In the case of the system proposed herein, if the spring 21 could return freely to the right each time the driver release the accelerator pedal abruptly with a view to change the vehicle speed, a change in the transmission ration would occur and cause the engine braking action to be reduced. In the arrangement contemplated in the example illustrated and described herein the movement of piston 22 and therefore of slide valve 20 to the right is retarded by the compression of fluid in chamber 24. The velocity at which this movement takes place is adjustable by altering the passage area of the jet or like orifice 27 disposed between the chamber 24 and the small reservoir 25. In the opposite direction, that is, to the left, no retarding effect takes place as the fluid can flow freely from 25 to 24 through valve 26.

The advantages deriving from the device described hereinabove are also felt when driving in town or on heavy-traffic roads, for it frequently happens to modify the foot pressure on the accelerator pedal either by necessity or by hesitation. It would be unpleasant and useless in this case to change the transmission ratio every second or so.

Of course, the invention should not be construed as being limited to the form of embodiment shown and illustrated herein, as many modifications and alterations may be brought thereto without departing from the spirit and scope of the invention as set forth in the appended claims.

I claim:

1. Control means for the operation of a variable speed transmission on a motor vehicle comprising the combination with the engine and the main drive shaft of said engine and a transmission device providing a continuously variable speed ratio interposed therebetween, a speed sensitive governor driven by said engine, a speed ratio control device operatively connected with said transmission, means for supplying fluid under pressure by said engine for operating said speed ratio control device, a slide valve controlled by said governor controlling the supply of fluid to said speed ratio control device to vary the transmission ratio, a spring counteracting the movement transmitted to said slide valve by said governor, a piston cooperating with one end of said spring a chamber in which said piston reciprocates, means for braking the movement of said piston in one direction while allowing free movement in the other direction, a push rod cooperating with said piston on the side thereof opposite said spring and a cam under the control of the operator of the vehicle cooperating with said piston and push rod to compress said spring and thereby modify the action of said slide valve in varying the transmission ratio.

2. Control means for the operation of a variable speed transmission on a motor vehicle comprising the combination with the engine and the main drive shaft of said engine and a transmission device providing a continuously variable speed ratio interposed therebetween, a speed sensitive governor driven by said engine, a speed ratio control device operatively connected with said transmission, means for supplying fluid under pressure by said engine for operating said speed ratio control device, a slide valve controlled by said governor controlling the supply of fluid to said speed ratio control device to vary the transmission ratio, a spring counteracting the movement transmitted to said slide valve by said governor, a piston cooperating with one end of said spring, an oil filled chamber in which said piston reciprocates, an oil reservoir having a gauged aperture communicating with said chamber, a one way valve controlling a second aperture in said reservoir communicating with said chamber whereby movement of said piston in one direction is braked a predetermined amount while movement in the other direction is substantially free, a push rod cooperating with said piston on the side thereof opposite said spring and a cam under the control of the operator of the vehicle cooperating with said piston and push rod to compress said spring and thereby modify the action of said slide valve in varying the transmission ratio.

3. Control means for the operation of a variable speed transmission on a motor vehicle comprising the combination with the engine and the main drive shaft of said engine and a transmission device providing a continuously variable speed ratio interposed therebetween, a speed sensitive governor driven by said engine, a speed ratio control device operatively connected with said transmission, means for supplying fluid under pressure by said engine for operating said speed ratio control device, a slide valve controlled by said governor controlling the supply of fluid to said speed ratio control device to vary the transmission ratio, a spring counteracting the movement transmitted to said slide valve by said governor, a piston cooperating with one end of said spring, a push rod cooperating with said piston on the side thereof opposite said spring and a cam under the control of the operator of the vehicle cooperating with said piston and push rod to compress said spring and thereby modify the action of said slide valve in varying the transmission ratio, an engine throttle, a second cam movable synchronously with said first mentioned cam controlling said throttle and means for varying the transmission ratio under the control of the operator without changing the throttle setting.

4. Control means for the operation of a variable speed transmission on a motor vehicle comprising the combination with the engine and the main drive shaft of said engine and a transmission device providing a continuously variable speed ratio interposed therebetween, a speed sensitive governor driven by said engine, a speed ratio control device operatively connected with said transmission, means for supplying fluid under pressure by said engine for operating said speed ratio control device, a slide valve controlled by said governor controlling the supply of fluid to said speed ratio control device to vary the transmission ratio, a spring counteracting the movement transmitted to said slide valve by said governor, a piston cooperating with one end of said spring, a push rod cooperating with said piston on the side thereof opposite said spring and a cam under the control of the operator of the vehicle cooperating with said piston and push rod to compress said spring and thereby modify the action of said slide valve in varying the transmission ratio, an engine throttle, a second cam movable synchronously with said first mentioned cam controlling said throttle and means for varying the transmission ratio under the control of the operator without changing the setting of said cams.

5. Control means for the operation of a variable speed transmission on a motor vehicle comprising the combination with the engine and the main drive shaft of said engine and a transmission device providing a continuously variable speed ratio interposed therebetween, a speed sensitive governor driven by said engine, a speed ratio control device operatively connected with said transmission, means for supplying fluid under pressure by said engine for operating said speed ratio control device, a slide valve controlled by said governor controlling the supply of fluid to said speed ratio control device to vary the transmission ratio, a spring counteracting the movement transmitted to said slide valve by said governor, a piston cooperating with one end of said spring, a push rod cooperating with said piston on the side thereof opposite said spring and a cam under the control of the operator of the vehicle cooperating with said piston and push rod to compress said spring and thereby modify the action of said slide valve in varying the transmission ratio, an engine throttle, a second cam movable synchronously with said first mentioned cam throttling said throttle and means for varying the transmission ratio under the control of the operator cooperating with said push rod without changing the throttle setting.

References Cited in the file of this patent
UNITED STATES PATENTS

| | | |
|---|---|---|
| 2,500,580 | Segsworth | Mar. 14, 1950 |
| 2,774,436 | Ferris | Dec. 18, 1956 |
| 2,905,150 | Ebert | Sept. 22, 1959 |